(12) United States Patent
Holung et al.

(10) Patent No.: US 11,157,088 B1
(45) Date of Patent: Oct. 26, 2021

(54) KEYBOARD ACTUATION IN CONVERTIBLE DEVICE

(71) Applicant: Lenovo (Singapore) Pte. Ltd., Singapore (SG)

(72) Inventors: Joseph Anthony Holung, Wake Forest, NC (US); Bouziane Yebka, Apex, NC (US); Joseph David Plunkett, Raleigh, NC (US); Philip John Jakes, Durham, NC (US); Tin-Lup Wong, Chapel Hill, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 0 days.

(21) Appl. No.: 16/984,775

(22) Filed: Aug. 4, 2020

(51) Int. Cl.
*B41J 5/00* (2006.01)
*G06F 3/02* (2006.01)
*G06F 3/0346* (2013.01)

(52) U.S. Cl.
CPC .......... *G06F 3/0216* (2013.01); *G06F 3/0346* (2013.01)

(58) Field of Classification Search
None
See application file for complete search history.

(56) References Cited

U.S. PATENT DOCUMENTS

| 6,055,153 | A | * | 4/2000 | Chiu | G06F 1/1616 361/679.09 |
|---|---|---|---|---|---|
| 10,797,699 | B1 | * | 10/2020 | Morrison | H01H 13/85 |
| 2006/0210340 | A1 | * | 9/2006 | Atzmon | G06F 3/0216 400/472 |

* cited by examiner

*Primary Examiner* — Carl Adams
(74) *Attorney, Agent, or Firm* — Ference & Associates LLC

(57) ABSTRACT

One embodiment provides a method, including: receiving, at an information handling device, an indication to transmit an electrical pulse to an electropermanent magnet; transmitting, responsive to the receiving and using a pulse transmitter, the electrical pulse to the electropermanent magnet; and affecting a movement of a keyboard of the information handling device based on the received electrical pulse. Other aspects are described and claimed.

20 Claims, 6 Drawing Sheets

KEYBOARD ACTUATION IN CONVERTIBLE DEVICE

BACKGROUND

The design of convertible information handling devices ("devices"), for example laptop computers, hybrid devices, handheld gaming consoles, and the like, provide users the flexibility to transition their device between two or more operating modes. More particularly, users may manipulate a position of the base and/or display section of their device to interact with the device in the way that best suits their contextual needs (e.g., in clamshell mode, in tent mode, in tablet mode, etc.). Certain functional aspects of the device may be enabled and/or disabled in each operating mode.

BRIEF SUMMARY

In summary, one aspect provides a method, comprising: receiving, at an information handling device, an indication to transmit an electrical pulse to an electropermanent magnet; transmitting, responsive to the receiving and using a pulse transmitter, the electrical pulse to the electropermanent magnet; and affecting a movement of a keyboard of the information handling device based on the received electrical pulse Another aspect provides an information handling device, comprising: a processor; a memory device that stores instructions executable by the processor to: receive an indication to transmit an electrical pulse to an electropermanent magnet; transmit, responsive to the receiving, the electrical pulse to the electropermanent magnet; and affect a movement of the keyboard of the information handling device based on the received electrical pulse.

A further aspect provides a product, comprising: a storage device that stores code, the code being executable by a processor and comprising: code that receives an indication to transmit an electrical pulse to an electropermanent magnet; code that transmits, responsive to the code that receives, the electrical pulse to the electropermanent magnet; and code that affects a movement of the keyboard of an information handling device based on the received electrical pulse.

The foregoing is a summary and thus may contain simplifications, generalizations, and omissions of detail; consequently, those skilled in the art will appreciate that the summary is illustrative only and is not intended to be in any way limiting.

For a better understanding of the embodiments, together with other and further features and advantages thereof, reference is made to the following description, taken in conjunction with the accompanying drawings. The scope of the invention will be pointed out in the appended claims.

DETAILED DESCRIPTION

Figure 1:
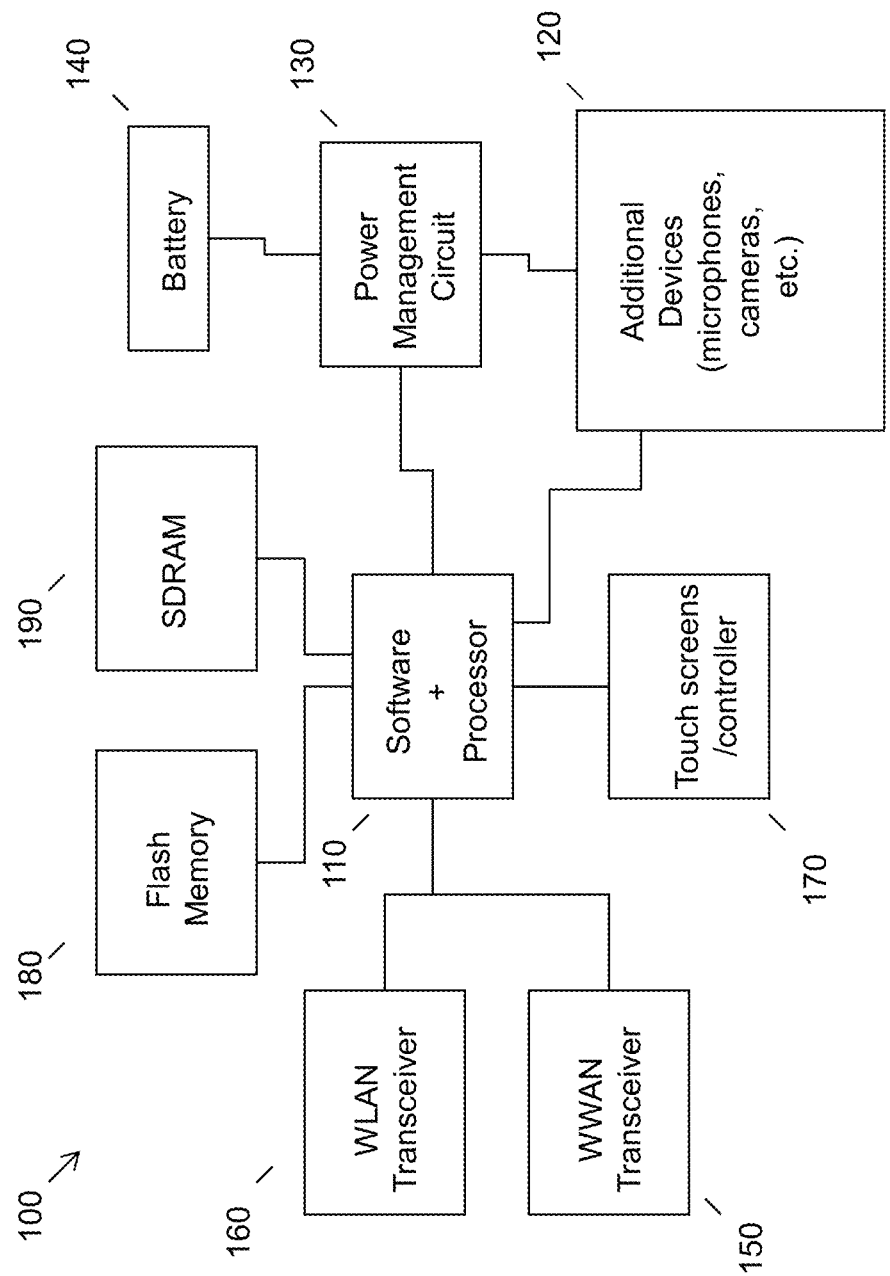
FIG. 1 illustrates an example of information handling device circuitry.

It will be readily understood that the components of the embodiments, as generally described and illustrated in the figures herein, may be arranged and designed in a wide variety of different configurations in addition to the described example embodiments. Thus, the following more detailed description of the example embodiments, as represented in the figures, is not intended to limit the scope of the embodiments, as claimed, but is merely representative of example embodiments.

Reference throughout this specification to "one embodiment" or "an embodiment" (or the like) means that a particular feature, structure, or characteristic described in connection with the embodiment is included in at least one embodiment. Thus, the appearance of the phrases "in one embodiment" or "in an embodiment" or the like in various places throughout this specification are not necessarily all referring to the same embodiment.

Furthermore, the described features, structures, or characteristics may be combined in any suitable manner in one or more embodiments. In the following description, numerous specific details are provided to give a thorough understanding of embodiments. One skilled in the relevant art will recognize, however, that the various embodiments can be practiced without one or more of the specific details, or with other methods, components, materials, et cetera. In other instances, well known structures, materials, or operations are not shown or described in detail to avoid obfuscation.

Convertible devices are generally composed of two primary sections: a base section and a display section. The base section usually contains one or more input devices (e.g., a keyboard, a touchpad, a combination thereof, etc.) and the display section contains at least one display that enables the user to visualize content on. Manipulation of the device between different operating modes (e.g., via rotation of the display section with respect to the base section, etc.) may enable or disable certain input controls. More particularly, some convertibles contain a rising keyboard that may rise or fall depending upon the operating mode being transitioned into. For example, a particular device may originally be in tablet mode during which the base section is folded behind the display section. In this mode, a keyboard of the device may be configured to sink into the base section so as to allow the user to hold the device easier, to not damage the keyboard if the tablet device is set on a surface, etc. During transition from tablet mode into laptop mode (e.g., by unfolding the base section from the display section, etc.) the keyboard may gradually rise out of the base section, thereby allowing the user to provide keyboard inputs to the device while it is in laptop mode.

Conventional rising keyboards operate via actuation of a mechanically operated slider. More particularly, this slider is coupled to a friction hinge that drives the keyboard up and down during rotation of the display section. This friction hinge is composed of a plurality of different components (e.g., linkages, springs, etc.) that may be at risk of failing due to repeated use. Additionally, such a hinge is expensive to implement, which thereby drives up the cost of the overall device.

Accordingly, an embodiment provides a device that facilitates movement of the slider via a magnetically operated system. In an embodiment, an indication may be received by the device to transmit an electrical pulse to an electropermanent magnet housed in a section of the device. The indication may be derived from sensor data, active application data, switch data, a combination thereof, and the like. Responsive to receiving the indication, an embodiment may then transmit an electrical pulse to the electropermanent magnet, which may thereby affect a polarity of the electropermanent magnet. This polarity manipulation may have a corresponding affect on a proximately positioned permanent magnet (i.e., attract the permanent magnet, repel the permanent magnet, etc.). The magnetic relationship between the electropermanent magnet and the permanent magnet may influence the linear movement of a slider that is associated with the permanent magnet and that is attached to a keyboard of the device. The slider movement may thereby directly affect the vertical movement of the keyboard (i.e., the rise and/or fall of the keyboard), as further described herein.

The illustrated example embodiments will be best understood by reference to the figures. The following description is intended only by way of example, and simply illustrates certain example embodiments.

While various other circuits, circuitry or components may be utilized in information handling devices, with regard to smart phone and/or tablet circuitry 100, an example illustrated in FIG. 1 includes a system on a chip design found for example in tablet or other mobile computing platforms. Software and processor(s) are combined in a single chip 110. Processors comprise internal arithmetic units, registers, cache memory, busses, I/O ports, etc., as is well known in the art. Internal busses and the like depend on different vendors, but essentially all the peripheral devices (120) may attach to a single chip 110. The circuitry 100 combines the processor, memory control, and I/O controller hub all into a single chip 110. Also, systems 100 of this type do not typically use SATA or PCI or LPC. Common interfaces, for example, include SDIO and I2C.

There are power management chip(s) 130, e.g., a battery management unit, BMU, which manage power as supplied, for example, via a rechargeable battery 140, which may be recharged by a connection to a power source (not shown). In at least one design, a single chip, such as 110, is used to supply BIOS like functionality and DRAM memory.

System 100 typically includes one or more of a WWAN transceiver 150 and a WLAN transceiver 160 for connecting to various networks, such as telecommunications networks and wireless Internet devices, e.g., access points. Additionally, devices 120 are commonly included, e.g., an image sensor such as a camera, audio capture device such as a microphone, etc. System 100 often includes one or more touch screens 170 for data input and display/rendering. System 100 also typically includes various memory devices, for example flash memory 180 and SDRAM 190.

Figure 2:
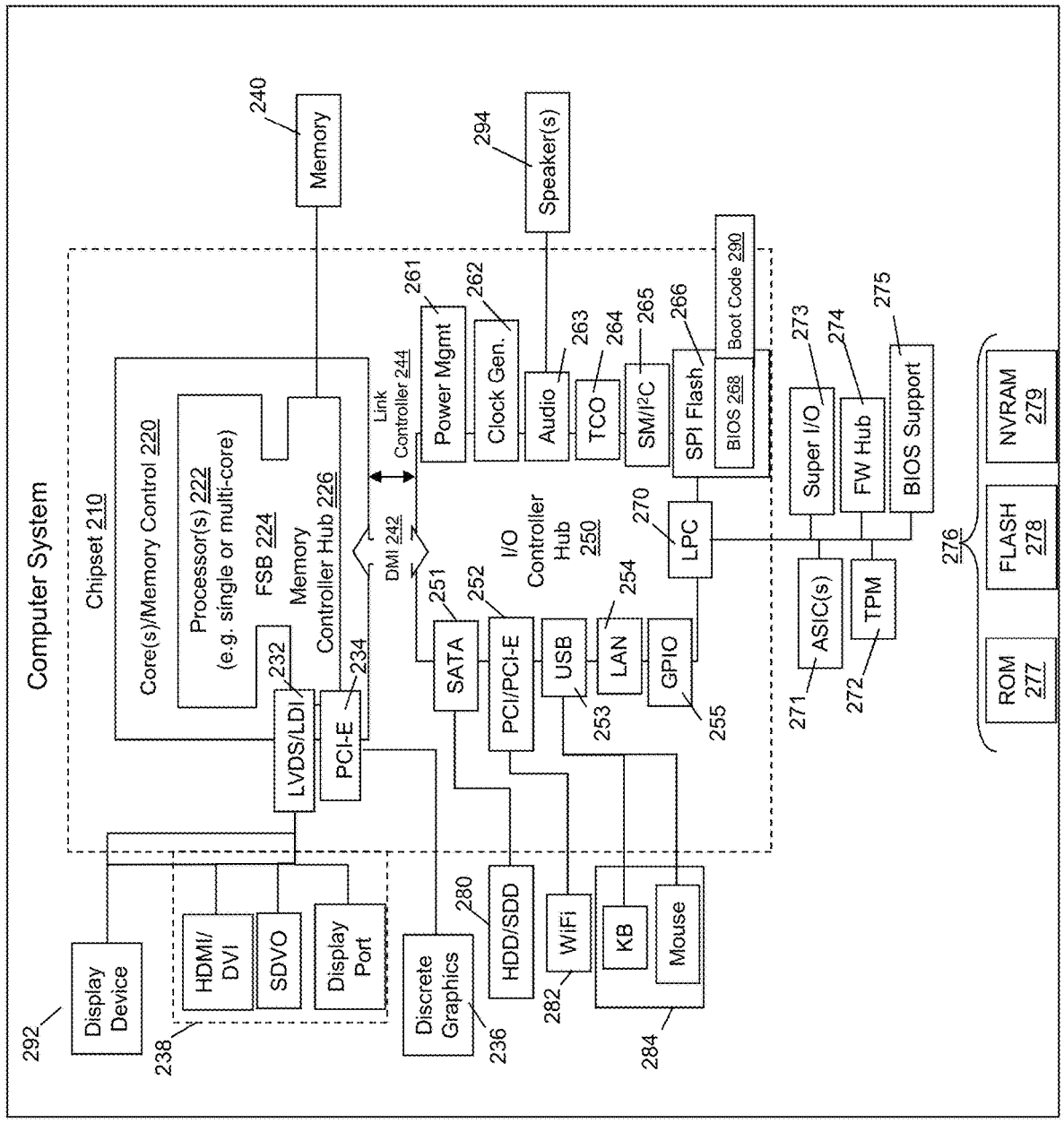
FIG. 2 illustrates another example of information handling device circuitry.

FIG. 2 depicts a block diagram of another example of information handling device circuits, circuitry or components. The example depicted in FIG. 2 may correspond to computing systems such as the THINKPAD series of personal computers sold by Lenovo (US) Inc. of Morrisville, N.C., or other devices. As is apparent from the description herein, embodiments may include other features or only some of the features of the example illustrated in FIG. 2.

The example of FIG. 2 includes a so-called chipset 210 (a group of integrated circuits, or chips, that work together, chipsets) with an architecture that may vary depending on manufacturer (for example, INTEL, AMD, ARM, etc.). INTEL is a registered trademark of Intel Corporation in the United States and other countries. AMD is a registered trademark of Advanced Micro Devices, Inc. in the United States and other countries. ARM is an unregistered trademark of ARM Holdings plc in the United States and other countries. The architecture of the chipset 210 includes a core and memory control group 220 and an I/O controller hub 250 that exchanges information (for example, data, signals, commands, etc.) via a direct management interface (DMI) 242 or a link controller 244. In FIG. 2, the DMI 242 is a chip-to-chip interface (sometimes referred to as being a link between a "northbridge" and a "southbridge"). The core and memory control group 220 include one or more processors 222 (for example, single or multi-core) and a memory controller hub 226 that exchange information via a front side bus (FSB) 224; noting that components of the group 220 may be integrated in a chip that supplants the conventional "northbridge" style architecture. One or more processors 222 comprise internal arithmetic units, registers, cache memory, busses, I/O ports, etc., as is well known in the art.

In FIG. 2, the memory controller hub 226 interfaces with memory 240 (for example, to provide support for a type of RAM that may be referred to as "system memory" or "memory"). The memory controller hub 226 further includes a low voltage differential signaling (LVDS) interface 232 for a display device 292 (for example, a CRT, a flat panel, touch screen, etc.). A block 238 includes some technologies that may be supported via the LVDS interface 232 (for example, serial digital video, HDMI/DVI, display port). The memory controller hub 226 also includes a PCI-express interface (PCI-E) 234 that may support discrete graphics 236.

In FIG. 2, the I/O hub controller 250 includes a SATA interface 251 (for example, for HDDs, SDDs, etc., 280), a PCI-E interface 252 (for example, for wireless connections 282), a USB interface 253 (for example, for devices 284 such as a digitizer, keyboard, mice, cameras, phones, microphones, storage, other connected devices, etc.), a network interface 254 (for example, LAN), a GPIO interface 255, a LPC interface 270 (for ASICs 271, a TPM 272, a super I/O 273, a firmware hub 274, BIOS support 275 as well as various types of memory 276 such as ROM 277, Flash 278, and NVRAM 279), a power management interface 261, a clock generator interface 262, an audio interface 263 (for example, for speakers 294), a TCO interface 264, a system management bus interface 265, and SPI Flash 266, which can include BIOS 268 and boot code 290. The I/O hub controller 250 may include gigabit Ethernet support.

The system, upon power on, may be configured to execute boot code 290 for the BIOS 268, as stored within the SPI Flash 266, and thereafter processes data under the control of one or more operating systems and application software (for example, stored in system memory 240). An operating system may be stored in any of a variety of locations and accessed, for example, according to instructions of the BIOS 268. As described herein, a device may include fewer or more features than shown in the system of FIG. 2.

Information handling circuitry, as for example outlined in FIG. 1 or FIG. 2, may be used in devices having at least one mechanism that affects a vertical movement of an integrated input component. For example, the circuitry outlined in FIG. 1 may be implemented in a mobile handheld device, whereas the circuitry outlined in FIG. 2 may be implemented in a laptop computer.

Figure 3:
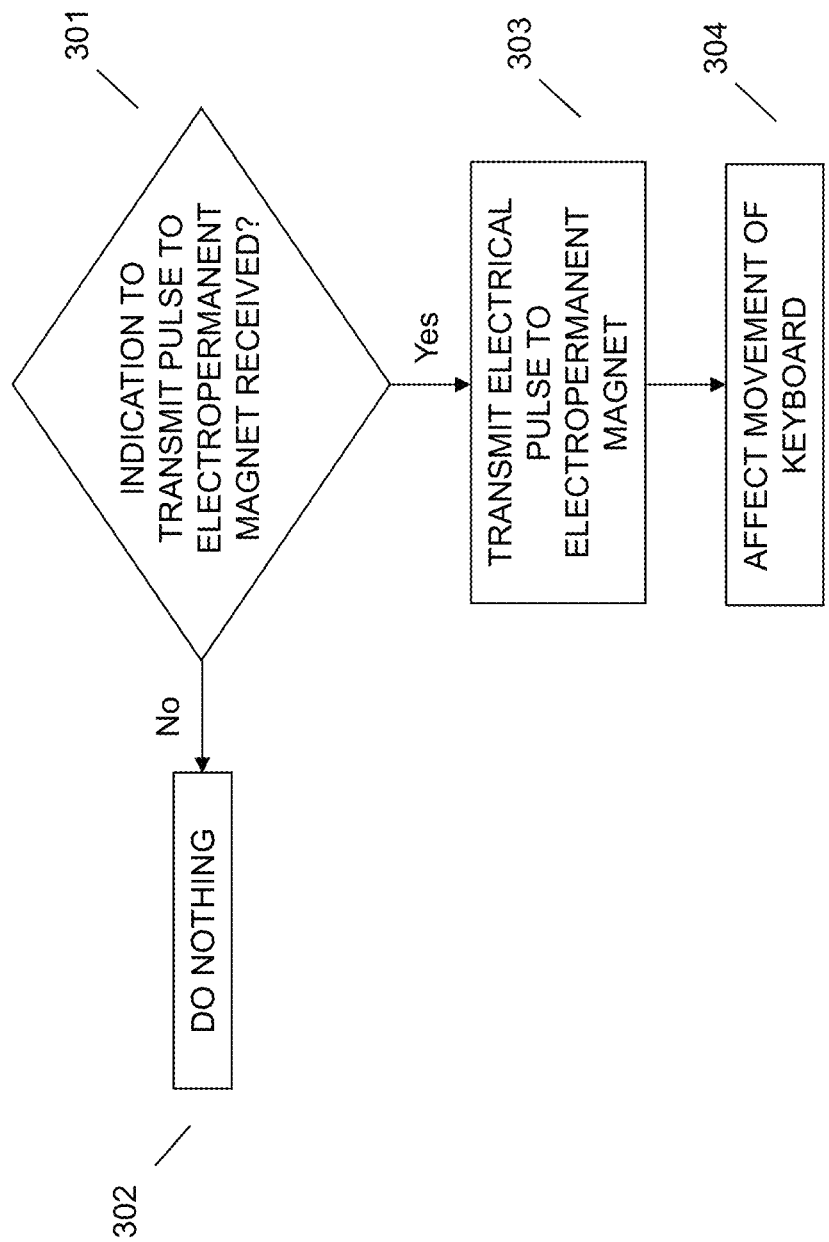
FIG. 3 illustrates an example method of adjusting a vertical position of a keyboard in a convertible device.

Referring now to FIG. 3, an embodiment provides a device having a magnetic component that can affect vertical movement of an integrated input component. At 301, an embodiment may receive an indication to transmit an electrical pulse to an electropermanent magnet integrated into a housing of the device. In an embodiment, at least one electropermanent magnet may be housed within a base section of the device (i.e., the section comprising the processor, an input component, etc.). At least one other magnet (i.e., a permanent magnet) may be positioned substantially proximate to the electropermanent magnet. Additional details regarding the relationship and positioning of these two magnet types are further disclosed herein.

In an embodiment, each electropermanent magnet may be configured to have a coil wound around it. When an electrical pulse is transmitted to the electropermanent magnet (e.g., via a pulse transmitter integrated into the device housing, etc.), a polarity associated with the electropermanent magnet may be affected. More particularly, if inactive a magnetic field of the electropermanent magnet may be activated and if active the magnetic field may be deactivated. When the magnetic field is active, other metallic objects may be attracted to it and vice versa. The magnetic field may remain in a particular attractive state until another electrical pulse is received.

In an embodiment, the indication to transmit the electrical pulse to the electropermanent magnet may be derived from one or more data sources. For instance, sensor data may be used to dynamically identify when to turn the magnetic field on or off. More particularly, one or more orientation sensors may be utilized to detect a rotational angle between a display section and a base section of the device. Responsive to determining that the rotational angle of the device has breached a predetermined rotational angle threshold, an embodiment may provide an indication to transmit the electrical signal to the electropermanent magnet. For example, an embodiment may receive an indication to transmit an electrical pulse to the electropermanent magnet responsive to detecting that the rotational angle has hit 180 degrees. Such an indication may correspond to a user's intention to transition their device from one mode to the next (e.g., from tablet mode to laptop mode or vice versa, etc.).

In an embodiment, one or more camera sensors (e.g., front-facing cameras, worldview cameras, etc.) integrated into one or more sections of the device may be utilized to determine when to transmit an electrical pulse. For instance, an embodiment may track user movements to determine whether a user has performed a movement that may be indicative of their intention to transition the device to a different operating mode (e.g., an embodiment may determine that a user is moving their hand toward a commonly grasped position on the display section, the base section, or both that is held when transitioning the device from one operating mode to another, etc.).

In an embodiment, one or more audio sensors (e.g., always-on microphones, etc.) may be utilized to detect situations in which a user has provided some audible indication that they desire to perform an operating mode transition. For example, the audible indication may be an explicit audible command that indicates the user's intention to perform a mode transition. As another example, the audible indication may be more contextual in nature. More particularly, an embodiment may record and subsequently analyze a user's speech to determine whether they have indicated an intent to transition their device between operating modes. For example, a user may provide an indication in a conversation they are having with another individual of their intent to transition from laptop mode to tablet mode (e.g., "I just finished writing this paper so now I'm going to watch on movie on my tablet", etc.).

Another data source that may be utilized to determine whether an indication was received is active application data. As used herein, active application data may refer to a top level application a user is interacting with. An embodiment may receive an indication of this application and may thereafter determine, from this knowledge, whether to transmit an electrical pulse to the electropermanent magnet. For example, responsive to determining that a word processing application has been opened and that a keyboard of the device is in a retracted state, an embodiment may receive an indication to transmit an electrical pulse to the electropermanent magnet in order to raise the keyboard (the details of this process are further described herein). Such an indication may be transmitted based upon a device's knowledge that the user, or a crowdsourced group of users, prefers to interact with word processing applications in laptop mode (i.e., with the keyboard raised above a surface of the base section). Alternatively, as an another example, responsive to determining that a video streaming application has been activated and that a keyboard of the device is protruding from the base section, an embodiment may receive an indication to transmit an electrical pulse to the electropermanent magnet in order to lower the keyboard. Such an indication may be transmitted based upon a devices' knowledge that the user, or a crowdsourced group of users, prefers to watch videos on their device in tablet mode.

Yet another data source that may be utilized to determine whether an indication was received is switch data. More particularly, a switch may exist on the device (e.g., a physical switch, a virtual switch displayed on a display screen of the device, etc.) that a user may toggle when they want to raise or lower the keyboard. Responsive to detecting that a user has flipped the physical or virtual switch, an embodiment may transmit an electrical pulse to the electropermanent magnet.

Responsive to not receiving, at 301, an indication to transmit an electrical pulse, an embodiment may, at 302, take no additional action. Conversely, if an indication is received, at 301, to transmit an electrical pulse, an embodiment may, at 303, transmit the electrical pulse to the electropermanent magnet via a pulse transmitter. Receipt of the pulse at the electropermanent magnet may adjust the polarity of the electropermanent magnet, which may correspondingly affect, at 304, a movement of an input component of the device. For simplicity purposes, the input component as described herein is directed toward a keyboard. However, it is important to note that this designation is not limiting and that other types of input components may be raised or lowered.

Figure 4:
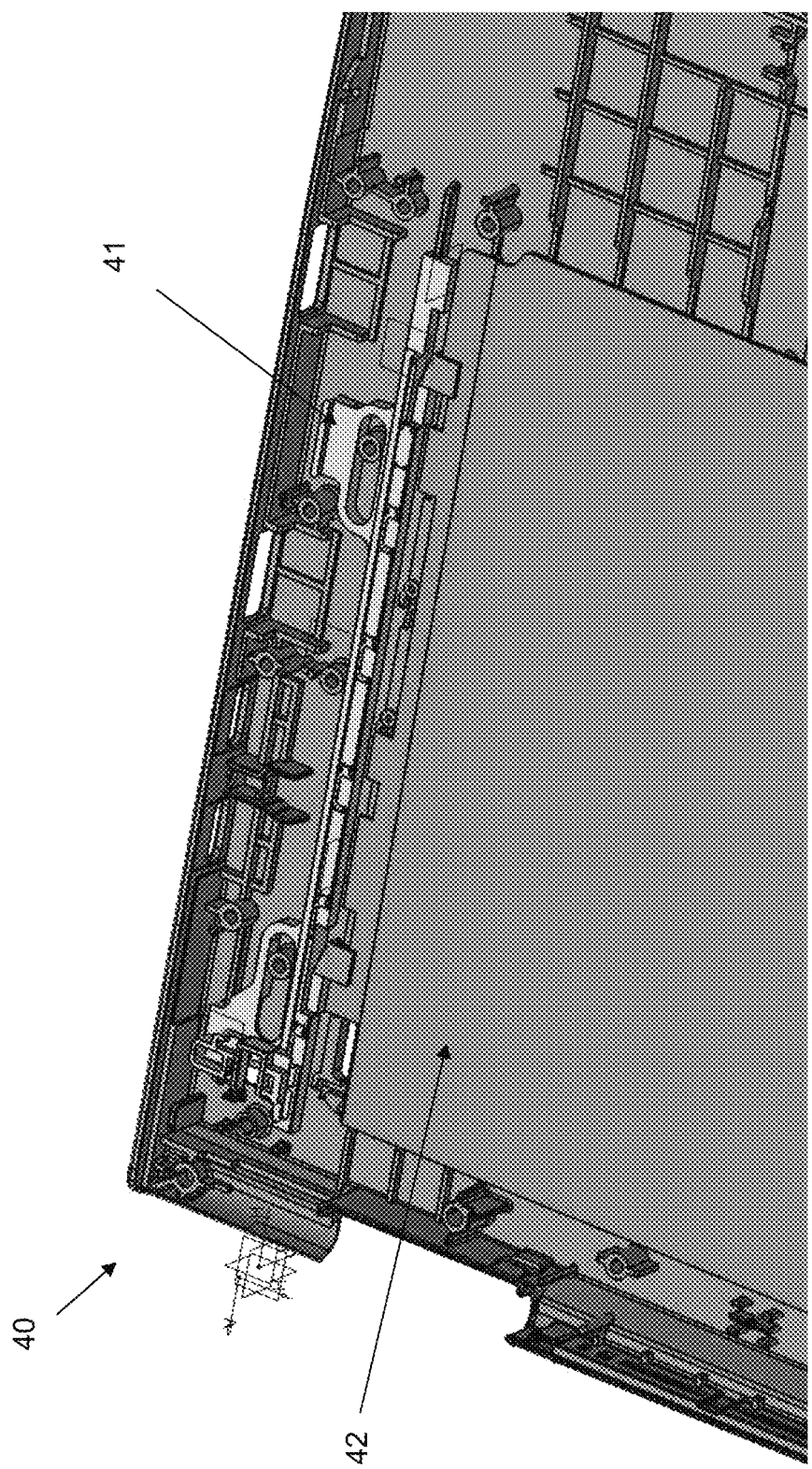
FIG. 4 illustrates a conventional mechanical slider as known in the art.

Referring now to FIG. 4, a device 40 is illustrated that contains a mechanical slider 41. The mechanical slider 41 may be housed within a base portion of the device 40 and may also be connected to a keyboard 42. As the slider moves linearly (e.g., from left to right, etc.) a position of the keyboard 42 may be adjusted. More particularly, as an example, if the slider 41 moves from left to right, then the keyboard 42 may be configured to be raised up (e.g., to a position above the base portion, etc.). When the keyboard 42 is protruding and the slider 41 moves from right to left, the keyboard 42 may be configured to be lowered (e.g., to a position below the base portion, etc.).

Figure 5:
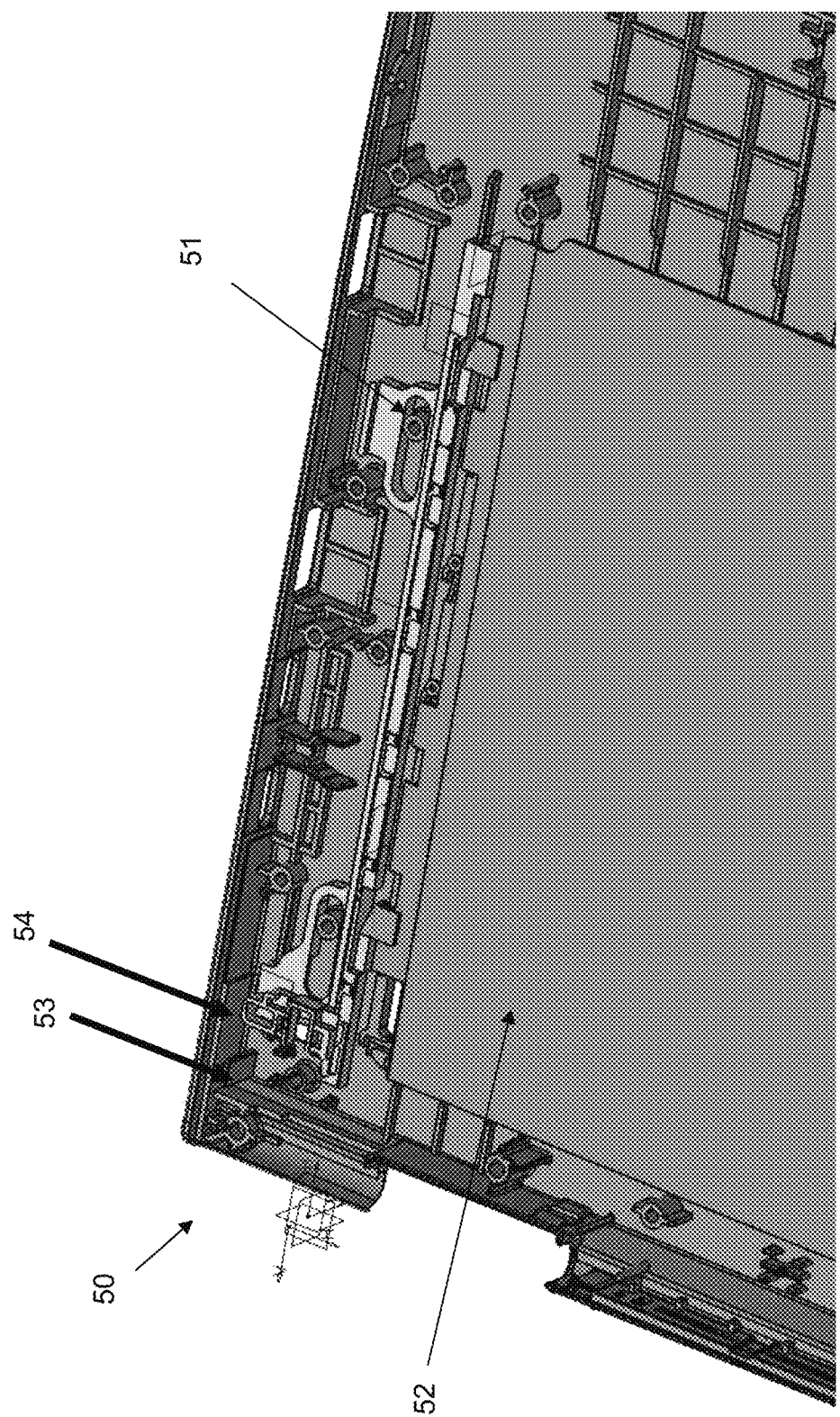
FIG. 5 illustrates a magnetic slider assembly according to an embodiment.

Referring now to FIG. 5, an embodiment provides a novel implementation of a device 50 containing a slider 51 that is attached to a keyboard 52. More particularly, in this implementation an electropermanent magnet 53 may be housed within the base section and a permanent magnet 54 (i.e., a magnet whose polarity stays fixed) may be attached to the slider 51 and may be positioned opposite of the electropermanent magnet 53. In an embodiment, when the electropermanent magnet 53 receives an electrical pulse, a magnetic field of the electropermanent magnet 53 may be adjusted and may thereby have a corresponding effect on the permanent magnet 54. For example, the electrical pulse may adjust the attractive state of the electropermanent magnet 53 so that an attraction is formed between the electropermanent magnet 53 and the permanent magnet 54. In this situation, the slider 51 may be influenced to move toward the side of the device 50 containing the electropermanent magnet 53. Receipt of another electrical pulse may adjust the attractive state of the electropermanent magnet 53 so that the permanent magnet 54 is repelled, which may correspondingly influence the slider to move away from the side of the device 50 containing the electropermanent magnet 53.

By influencing the movement of the slider 51, a vertical movement of the keyboard 52 may also be influenced. More particularly, the keyboard 52 may be lowered or raised as the linear motion of the slider 51 is adjusted. Details and characteristics regarding the ways in which the slider 51 interacts with the keyboard 52 to influence its vertical movement are known in the art and will be not be further elaborated upon here.

Figure 6:
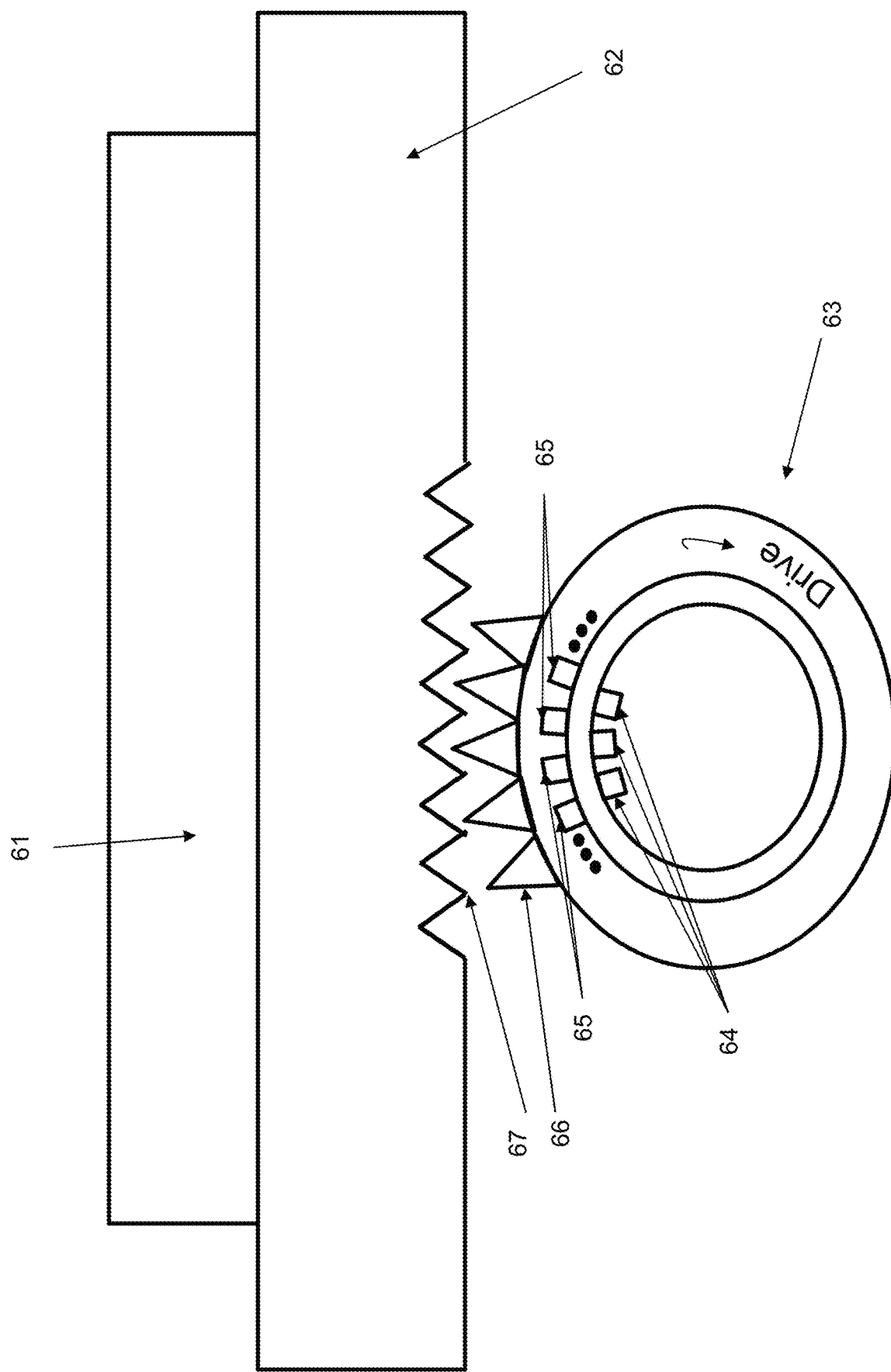
FIG. 6 illustrates another magnetic slider assembly according to an embodiment.

In certain situations, a single electropermanent magnet may not create enough of an attractive or repellent magnetic force to push or pull the slider all the way to the left or right. In these situations, the keyboard may be unable to be fully raised or lowered. Accordingly, an embodiment provides another implementation, illustrated in FIG. 6, in which a device containing a slider 61 is coupled to a rack assembly 62, which itself interacts with a pinion gear 63. In an embodiment, three electropermanent magnets 64 are attached to a stationary inner rotor of the pinion gear 63. A plurality of permanent magnets 65 are positioned on a rotating part within the pinion gear 63. As electrical pulses are received by the electropermanent magnets 64, the motion of the permanent magnets 65 may be influenced to create a rotary stepper, as more fully described and explained in commonly owned and assigned U.S. patent application Ser. No. 16/945,463, entitled "ELECTROPERMANENT MAGNET ASSEMBLY" and filed Jul. 31, 2020, which is incorporated by reference herein. The motion of the permanent magnets 65, as influenced by the changing attractive state of the electropermanent magnets, may correspondingly affect a rotary motion of the pinion gear 63 (e.g., the pinion gear 63 may begin to turn in the drive direction). In an embodiment, the pinion gear 63 may have a plurality of teeth 66 on an outer surface of the gear. These teeth 66 may interact with a corresponding set of teeth 67 on the rack assembly 62, which may in turn move the rack assembly 62, which the slider 61 is coupled to, in a linear motion. It is in this way that a series of electrical pulses may be utilized to move the slider 61 between the extreme left and right positions in order to effectively raise and lower the keyboard.

It is important to note that although the foregoing disclosure was described primarily in relation to convertible devices, specifically laptops, handhelds, etc., such a designation is not limiting. More particularly, the magnetic mechanism(s) described above that influence the raising or lowering of an input component may be utilized in virtually any device/object containing a component that may be raised or lowered. For example, the concepts described above may be implemented into kitchen appliances, cabinetry, furniture, other devices and/or objects, etc.

The various embodiments described herein thus represent a technical improvement to conventional methods for raising and lowering an input component of a device during a change in an operational mode of the device. Using the techniques described herein, an embodiment may receive an indication to transmit an electrical pulse to an electropermanent magnet. The indication may be derived from one or more different data sources such as sensor data, active application data, switch toggle data, etc. Responsive to receiving the indication, an embodiment may transmit the electrical pulse to the electropermanent magnet, which may thereby affect an attractive state of the magnetic field surrounding the electropermanent magnet. This change may influence the movement of a permanent magnet that is integrally or operatively associated with a slider, which may itself influence the vertical movement of the input component. Such an embodiment may optimize the way in which users manipulate their convertible devices from one mode to another.

As will be appreciated by one skilled in the art, various aspects may be embodied as a system, method or device program product. Accordingly, aspects may take the form of an entirely hardware embodiment or an embodiment including software that may all generally be referred to herein as a "circuit," "module" or "system." Furthermore, aspects may take the form of a device program product embodied in one or more device readable medium(s) having device readable program code embodied therewith.

It should be noted that the various functions described herein may be implemented using instructions stored on a device readable storage medium such as a non-signal storage device that are executed by a processor. A storage device may be, for example, a system, apparatus, or device (e.g., an electronic, magnetic, optical, electromagnetic, infrared, or semiconductor system, apparatus, or device) or any suitable combination of the foregoing. More specific examples of a storage device/medium include the following: a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a storage device is not a signal and "non-transitory" includes all media except signal media.

Program code embodied on a storage medium may be transmitted using any appropriate medium, including but not limited to wireless, wireline, optical fiber cable, RF, et cetera, or any suitable combination of the foregoing.

Program code for carrying out operations may be written in any combination of one or more programming languages. The program code may execute entirely on a single device, partly on a single device, as a stand-alone software package, partly on single device and partly on another device, or entirely on the other device. In some cases, the devices may be connected through any type of connection or network, including a local area network (LAN) or a wide area network (WAN), or the connection may be made through other devices (for example, through the Internet using an Internet Service Provider), through wireless connections, e.g., near-field communication, or through a hard wire connection, such as over a USB connection.

Example embodiments are described herein with reference to the figures, which illustrate example methods, devices and program products according to various example embodiments. It will be understood that the actions and functionality may be implemented at least in part by program instructions. These program instructions may be provided to a processor of a device, a special purpose information handling device, or other programmable data processing device to produce a machine, such that the instructions, which execute via a processor of the device implement the functions/acts specified.

It is worth noting that while specific blocks are used in the figures, and a particular ordering of blocks has been illustrated, these are non-limiting examples. In certain contexts, two or more blocks may be combined, a block may be split into two or more blocks, or certain blocks may be re-ordered or re-organized as appropriate, as the explicit illustrated examples are used only for descriptive purposes and are not to be construed as limiting.

As used herein, the singular "a" and "an" may be construed as including the plural "one or more" unless clearly indicated otherwise.

This disclosure has been presented for purposes of illustration and description but is not intended to be exhaustive or limiting. Many modifications and variations will be apparent to those of ordinary skill in the art. The example embodiments were chosen and described in order to explain principles and practical application, and to enable others of ordinary skill in the art to understand the disclosure for various embodiments with various modifications as are suited to the particular use contemplated.

Thus, although illustrative example embodiments have been described herein with reference to the accompanying figures, it is to be understood that this description is not limiting and that various other changes and modifications may be affected therein by one skilled in the art without departing from the scope or spirit of the disclosure.

What is claimed is:

1. A method, comprising:
   receiving, at an information handling device, an indication to transmit an electrical pulse to an electropermanent magnet, wherein the information handling device is a clamshell device comprising a base section and a display section and wherein the receiving the indication comprises identifying an intention of a user of the information handling device to rotationally manipulate the base section with respect to the display section;
   transmitting, responsive to the receiving and using a pulse transmitter, the electrical pulse to the electropermanent magnet; and
   affecting a movement of a keyboard integrated within the base section of the information handling device based on the received electrical pulse, wherein the affecting the movement comprises vertically adjusting a position of the keyboard with respect to a remainder of the base section.

2. The method of claim 1, wherein the receiving comprises receiving the indication from a sensor integrally coupled to the information handling device.

3. The method of claim 2, wherein the sensor is configured to detect when a rotational angle of the display section of the information handling device has fallen below a predetermined threshold rotational angle with respect to the base section of the information handling device.

4. The method of claim 1, wherein the receiving the indication comprises receiving the indication from active application data.

5. The method of claim 1, wherein the receiving the indication comprises receiving the indication from a manually toggled switch.

6. The method of claim 1, wherein the affecting the movement comprises actuating a linear motion of a slider integrally coupled to the keyboard.

7. The method of claim 1, wherein the affecting comprises raising the keyboard above a surface of a base section of the information handling device.

8. The method of claim 1, wherein the affecting comprises lowering the keyboard below a surface of a base section of the information handling device.

9. The method of claim 1, wherein:
   the electropermanent magnet is integrated into a pinion gear comprising a plurality of teeth;
   the plurality of teeth are configured to interact with corresponding teeth of a rack assembly;
   the rack assembly being attached to a slider that is integrally coupled to the keyboard.

10. The method of claim 9, wherein the transmitting comprises transmitting a plurality of pulses to the electropermanent magnet and wherein the affecting comprises:
    facilitating, in response to each received electrical pulse, a rotation of the pinion gear; and
    affecting, based on the rotation, a linear movement of the slider.

11. An information handling device, comprising:
    a base section; and
    a display section;
    a processor;
    a memory device that stores instructions executable by the processor to:
    receive an indication to transmit an electrical pulse to an electropermanent magnet, wherein the receiving the indication comprises identifying an intention of a user of the information handling device to rotationally manipulate the base section with respect to the display section;
    transmit, responsive to the receiving, the electrical pulse to the electropermanent magnet; and
    affect a movement of a keyboard integrated within the base section of the information handling device based on the received electrical pulse, wherein the affecting the movement comprises vertically adjusting a position of the keyboard with respect to a remainder of the base section.

12. The information handling device of claim 11, wherein the instructions executable by the processor to receive comprise instructions executable by the processor to receive the indication from a sensor integrally coupled to the information handling device and wherein the sensor is configured to detect when a rotational angle of a display section of the information handling device has fallen below a predetermined threshold rotational angle with respect to a base section of the information handling device.

13. The information handling device of claim 12, wherein the instructions executable by the processor to receive the indication comprise instructions executable by the processor to receive the indication from active application data.

14. The information handling device of claim 11, wherein the instructions executable by the processor to receive the indication comprise instructions executable by the processor to receive the indication from a manually toggled switch.

15. The information handling device of claim 11, wherein the instructions executable by the processor to affect the movement comprise instructions executable by the processor to actuate a linear motion of a slider integrally coupled to the keyboard.

16. The information handling device of claim 11, wherein the instructions executable by the processor to affect comprise instructions executable by the processor to raise the keyboard above a surface of the base section of the information handling device.

17. The information handling device of claim 11, wherein the instructions executable by the processor to affect comprise instructions executable by the processor to lower the keyboard below a surface of the base section of the information handling device.

18. The information handling device of claim 11, wherein:
the electropermanent magnet is integrated into a pinion gear comprising a plurality of teeth;
the plurality of teeth are configured to interact with corresponding teeth of a rack assembly;
the rack assembly being attached to a slider that is integrally coupled to the keyboard.

19. The information handling device of claim 11, wherein the instructions executable by the processor to transmit comprise instructions executable by the processor to transmit a plurality of pulses to the electropermanent magnet and wherein the instructions executable by the processor to affect comprise instructions executable by the processor to:
facilitate, in response to each received electrical pulse, a rotation of the pinion gear; and
affect, based on the rotation, a linear movement of the slider.

20. A product, comprising:
a storage device that stores code, the code being executable by a processor and comprising:
code that receives an indication to transmit an electrical pulse to an electropermanent magnet contained within an information handling device comprising a base section and a display section, wherein the code that receives the indication comprises code that identifies an intention of a user of the information handling device to rotationally manipulate the base section with respect to the display section;
code that transmits, responsive to the code that receives, the electrical pulse to the electropermanent magnet; and
code that affects a movement of a keyboard integrated within the base section of an information handling device based on the received electrical pulse, wherein the code that affects the movement comprises code that vertically adjusts a position of the keyboard with respect to a remainder of the base section.

\* \* \* \* \*